United States Patent [19]

Fushiya et al.

[11] Patent Number: 4,986,369

[45] Date of Patent: Jan. 22, 1991

[54] TORQUE ADJUSTING MECHANISM FOR POWER DRIVEN ROTARY TOOLS

[75] Inventors: Fusao Fushiya; Michio Okumura, both of Anjo, Japan

[73] Assignee: Makita Electric Works, Ltd., Anjo, Japan

[21] Appl. No.: 377,156

[22] Filed: Jul. 10, 1989

[30] Foreign Application Priority Data

Jul. 11, 1988 [JP] Japan ............................ 63-91644[U]
Jul. 11, 1988 [JP] Japan ............................ 63-91646[U]
May 25, 1989 [JP] Japan ............................ 1-60860[U]

[51] Int. Cl.[5] .............................................. B23Q 5/00
[52] U.S. Cl. ...................................... 173/12; 81/467
[58] Field of Search ........................... 173/12, 48, 163; 81/473, 474, 475, 476, 467

[56] References Cited

U.S. PATENT DOCUMENTS 4,823,885 4/1989 Okumura ............................ 173/12

FOREIGN PATENT DOCUMENTS 0132774 7/1984 European Pat. Off. .
214794 10/1984 Fed. Rep. of Germany .
59-143670 3/1983 Japan .
63-30476 8/1983 Japan .
59-14367 9/1984 Japan .

*Primary Examiner*—Douglas D. Watts
*Assistant Examiner*—Willmon Fridie, Jr.
*Attorney, Agent, or Firm*—Dennison, Meserole, Pollack & Scheiner

[57] ABSTRACT

A power driven rotary tool includes a tool housing and an electric motor mounted within the tool housing. A first clutch member is operatively connected to the electric motor. A spindle is rotatably mounted in the tool housing and has a tool bit removably secured to the front end thereof. A second clutch member is operatively connected to the spindle and is shiftable between a first position in which the second clutch member is in driving engagement with the first clutch member and a second position in which the second clutch member is in sliding engagement with the first clutch member. A biasing mechanism is provided for normally biasing the second clutch member into driving engagement with the first clutch member. A control mechanism is disposed in the tool housing for steplessly adjusting the biasing force of the biasing mechanism. A manually-adjustable operating mechanism is provided for operating the control mechanism from outside of the tool. A positioning mechanism is mounted on the tool housing for holding the control mechanism in an operative position adjusting the biasing force of the biasing mechanism.

4 Claims, 5 Drawing Sheets

TORQUE ADJUSTING MECHANISM FOR POWER DRIVEN ROTARY TOOLS

BACKGROUND OF THE INVENTION

The present invention relates to an improvement in power driven rotary tools such as screwdrivers and drills, and more particularly to an improvement in such a rotary tool having a torque adjusting mechanism for adjusting driving torque to be transmitted to a spindle of the tool to a fixed value.

Power tools having a torque adjusting mechanism are disclosed, for example, in Japanese Laid-open Utility Model Publications Nos. 59-143670 and 63-30476.

Both of the prior art power tools include sliding clutch members provided between an output shaft of the motor and a spindle of the power tool, and the pressing force between the sliding clutches is adjusted so as to vary the value of torque which causes the clutch members to slide, that is, maximum torque to be transmitted to the spindle of the power tool.

In the prior art power tools as described above, the pressing force between the sliding clutch members is incrementally or steppingly adjusted, so that the maximum torque to be transmitted to the spindle of the power tool is steppingly varied to a torque of, for example, 20 kg, 30 kg or 40 kg.

Such a stepwise adjusting means of the prior art involves a practical problem. Specifically, a user may require, for example, a torque of 25 kg in one case, and a torque of 38 kg in another case. If the required torque is fortunately one of the steppingly adjustable torques, the prior art is sufficiently effective to meet the required torque. However, if any torque intermediate two adjacent steppingly adjustable torques is required, the prior art cannot provide the required torque.

For this purpose, various kinds of tools, for example, for 25 kg torque and 35 kg torque could be prepared, but this would reduce the advantage of mass production.

SUMMARY OF THE INVENTION

It is, accordingly, an object of the present invention to provide a power driven rotary tool in which the maximum torque may be adjusted to any desired value.

It is another object of the present invention to provide such a power tool which may effectively hold the tool at the value adjusted.

It is a further object of the present invention to provide such a power tool in which various torque settings may be achieved by a single unit of component parts, thereby increasing the effects of mass production.

The power driven rotary tool includes, according to the present invention, a tool housing and an electric motor mounted within the tool housing. A first clutch member is operatively connected to the electric motor. A spindle is rotatably mounted in the tool housing and has a tool bit removably secured to the front end thereof. A second clutch member is operatively connected to the spindle and is shiftable between a first position in which the second clutch member is in driving engagement with the first clutch member and a second position in which the second clutch member is in sliding engagement with the first clutch member. A biasing mechanism is provided for normally biasing the second clutch member into driving engagement with the first clutch member. A control mechanism is disposed in the tool housing for steplessly adjusting the biasing force of the biasing mechanism. A manually-adjustable operating mechanism is provided for operating the control mechanism from outside of the tool. A positioning mechanism is mounted on the tool housing for holding the control mechanism in an operative position adjusting the biasing force of the biasing mechanism.

The present invention will become more fully apparent from the claims and the description as it proceeds in connection with the drawings.

DETAILED DESCRIPTION OF THE PREFERRED EMBODIMENTS

Figure 1:
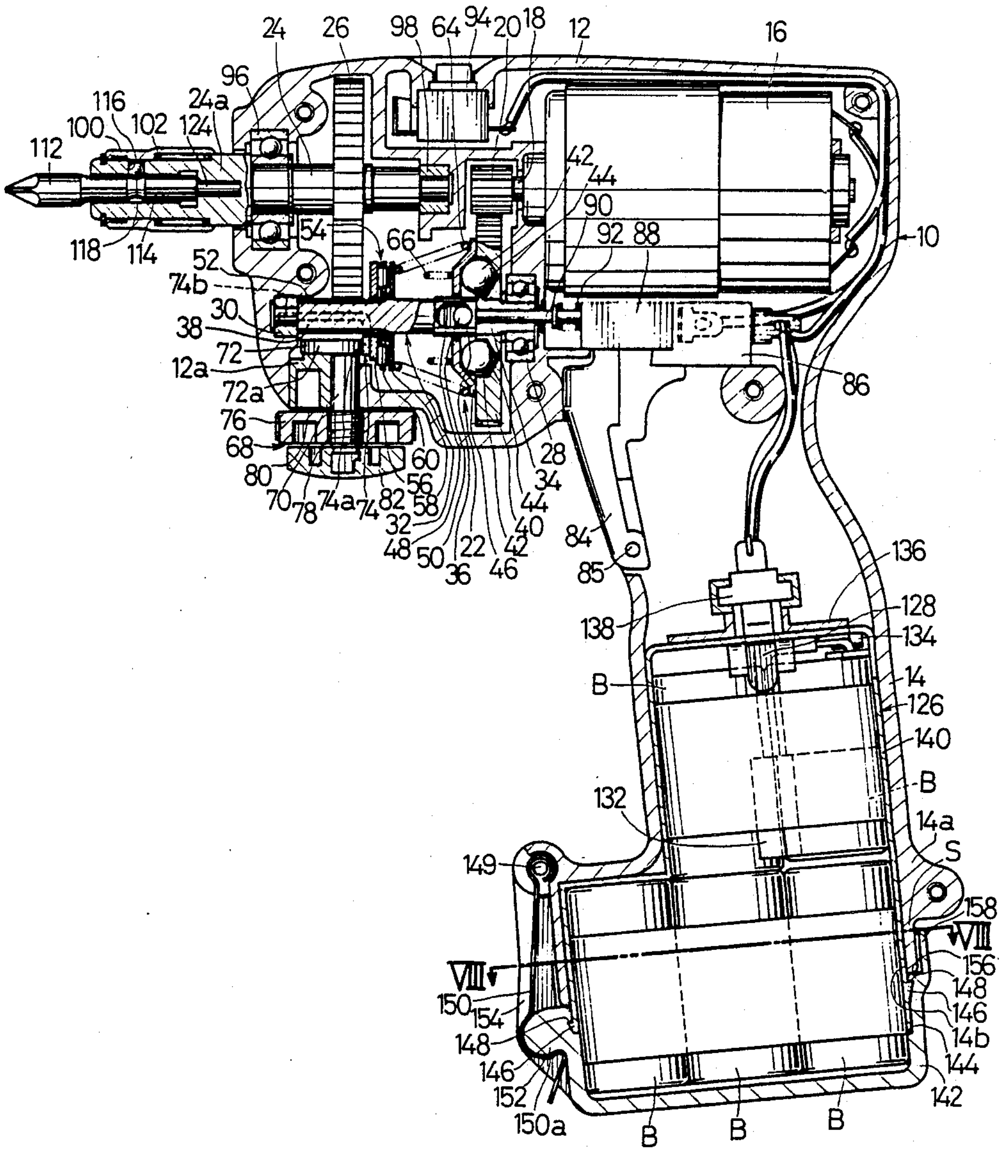
FIG. 1 is a sectional view of a power tool incorporating a preferred embodiment of the present invention.

Referring now to the drawings and to FIG. 1 in particular, shown therein is a power driven screwdriver incorporating a first embodiment of the present invention. As shown therein, the screwdriver includes a hollow integral housing 10 composed of an upper tool housing 12 and a lower battery housing 14 serving as a handle housing.

A reversible electric motor 16 is mounted in the rear region of the tool housing 12 and has an output shaft 18. Rotation of the output shaft 18 of the motor 16 is transmitted through a driving gear 20 secured to the output shaft 18 to a clutch mechanism 22. The rotation is then transmitted through a driven gear 26 to a spindle 24 positioned in the front upper region of the tool housing 12.

The clutch mechanism 22 includes a clutch shaft 32 rotatably supported in the tool housing 12 through bearings 28 and 30 and extending parallel to the output shaft 18. The clutch shaft 32 has a hollow shaft portion 34 at one end thereof, an enlarged-diameter portion 36 at the medial portion thereof, and a splined portion 38 at the other end thereof. A first clutch disc 40 is loosely fitted on the hollow shaft portion 34 of the clutch shaft 32 and has peripheral teeth normally meshed with the driving gear 20 of the output shaft 18. Clutch balls 42 are partially received with play within two diametrically opposite recesses 44 formed in the front end face of the first clutch disc 40. A second clutch disc 46 of a generally dish-like configuration is loosely fitted on the enlarged-diameter portion 36 of the clutch shaft 32 is opposed relation tot he first clutch disc 40 so as to hold the clutch balls 42 therebetween. A slot 48 is formed diametrically through the enlarged-diameter portion 36 and extends axially thereof. A clutch pin 50 is loosely fitted in the slot 48 and has both ends engaged in two opposite cutouts (not shown) formed in the outer peripheral portion of the second clutch disc 46. The splined portion 38 has in the front region thereof a spline 52 meshed with the driven gear 26, and carries a spring bearing member 54 axially movably therealong at the back of the spline 52. The spring bearing member 54 includes a slider 56, a disc 58, and a thrust bearing 60 interposed between these components 56 and 58. A first coil spring 64 is disposed in compression between the spring bearing member 54 and the second clutch disc 46 and is adapted for normally urging the second clutch disc 46 toward the first clutch disc 40. A second coil spring 66 which is shorter in length and smaller in diameter than the first coil spring 64, is positioned around the enlarged-diameter portion 36.

Thus, a torque transmitting mechanism is constructed by the output shaft 18 of the electric motor 16, the driving gear 20, the clutch mechanism 22, the driven gear 26, the spindle 24 and other components. Specifically, rotation of the output shaft 18 of the electric motor 16 in either forward or reverse direction is transmitted from the driving gear 20 and the first clutch disc 40 through engagement between the clutch balls 42 and the clutch pin 50 of the second clutch disc 46 to the clutch shaft 32. As this occurs, the spindle 24 is rotated in the forward or reverse direction through engagement between the splined portion 38 of the clutch shaft 32 and the driven gear 26. In case overload is imposed on the spindle 24 to impede rotation thereof, rotation of the associated parts of the clutch shaft 32 is impeded, causing the clutch balls 42 in the first clutch disc 40 rotated with the output shaft 18 of the electric motor 16 to strike on the outer periphery of the clutch pin 50. As a result, the clutch pin 50 and the second clutch disc 46 are moved forward in the axial direction of the clutch shaft 32 against the biasing force of the first coil spring 64, so that transmission of rotation from the first clutch disc 40 to the second clutch disc 46 is interrupted, and the driving gear 20 idly rotates relative to the clutch shaft 32.

An adjusting mechanism 68 is provided in the front lower region of the tool housing 12 to adjust the biasing force of the first coil spring 64. The adjusting mechanism 68 includes an adjusting shaft 70 rotatably supported in a shoulder portion 12*a* of the tool housing 12 and has one end positioned adjacent the splined portion 38 of the clutch shaft 32 in the clutch mechanism 22 and the other end projecting out of the tool housing 12. The adjusting shaft 70 is integrally secured at the one end thereof to an adjusting plate 72 which constitutes a control member for adjusting the biasing force of the first coil spring 64. The adjusting plate 72 has a cam face 72*a* formed on the outer periphery thereof and disposed in opposing relation to the front surface of the slider 56 of the spring bearing member 54 and has a lower surface which abuts on the shoulder portion 12*a* of the tool housing 12.

An abutting member 74 of a generally L-shape is provided and extends axially of the splined portion 38 of the clutch shaft 32. Specifically, the abutting member 74 has a shorter leg 74*a* inserted between the cam face 72*a* and the front surface of the slider 56 and has forked longer legs 74*b* (only one of which is shown in FIG. 1) extending axially of the splined portion 38 for sliding movement therealong. With this arrangement, the front surface of the slider 56 is normally urged through the abutting member 74 toward the cam face 72*a* by the first coil spring 64, and, as the adjusting shaft 70 is rotated, the cam face 72*a* correspondingly changes its engaging portion with the abutting member 74, so that the slider 56 is shifted axially of the splined portion 38.

Now, the procedure of determining the configuration of the cam face 72*a* will be described with reference to FIG. 2.

Figure 2:
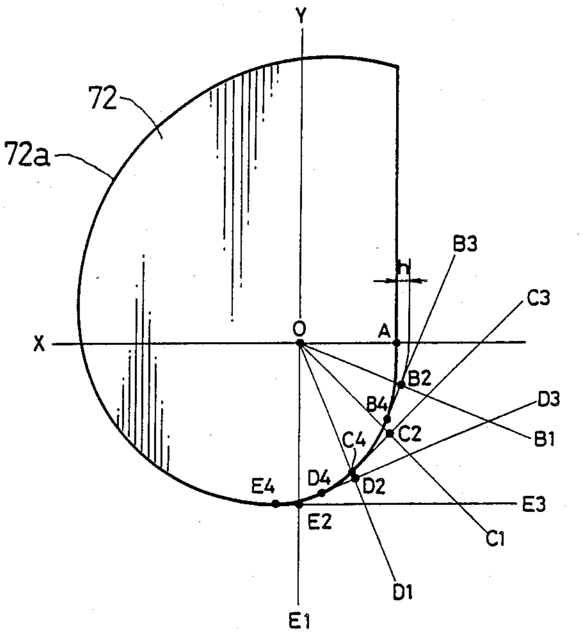
FIG. 2 is a schematic view illustrating the cam face of the adjusting plate.

In FIG. 2, the letter O designates the center of rotation of the cam, and a minimum radius OA of the cam is determined. The minimum radius OA is set to correspond to a minimum value in the range of the adjustable maximum torque. Then, lines OB1, OC1, OD1, . . . are drawn at 22.5° intervals from the line OA in a clockwise direction. Points B2, C2, D2, . . . are marked on the line OB1 at a distance of OA+h, on the line OC1 at a distance of OA+2h, on the line OD1 at a distance of OA+3h, respectively. Then, a line B3 passing B2 and extending perpendicular to OB1, a line C3 passing C2 and extending perpendicular to OC1, a line D3 passing D2 and extending perpendicular to OD1, . . . are drawn. A circle passing A is drawn in such a manner that the line B3 is tangent to the circle, and a point B4 on the circle in contact with B3 is marked. A circle passing B4 is drawn in such a manner that the line C3 is tangent to the circle, and a point C4 on the circle in contact with C3 is marked. Similarly, points D4, E4, . . . are marked. Then, the points B4, C4, D4, E4, . . . are joined in a smooth curve which defines the cam face 72*a*. The cam face thus defined enables the first coil spring 64 to be compressed in response to the rotation of the cam. As shown in FIG. 2, the cam face 72*a* defines an effective face over an angle range of 270°.

Figure 3:
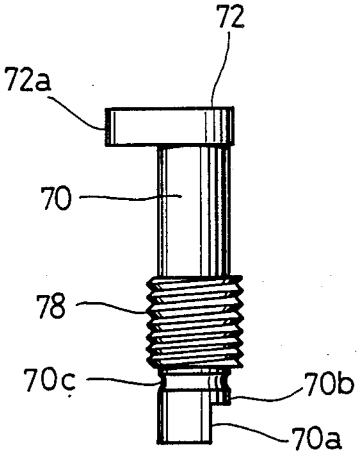
FIG. 3 is a side view of the adjusting shaft.

As shown in FIG. 1, the other end of the adjusting shaft 70 has a threaded portion 78 which extends outwardly of the tool housing 12 and which threadedly engages a tightening nut 76. A washer 80 is interposed between the tightening nut 76 and the shoulder portion 12*a*. Thus, the rotational position of the adjusting shaft 70 may be locked by tightening the shoulder portion 12*a* through the adjusting plate 72 and the nut 76. Also, as best shown in FIG. 3, the other end of the adjusting shaft 70 is formed adjacent the threaded portion 78 with a cutout face 70*a*, a shoulder portion 70*b*, and a rounded groove 70*c*.

Figure 4:
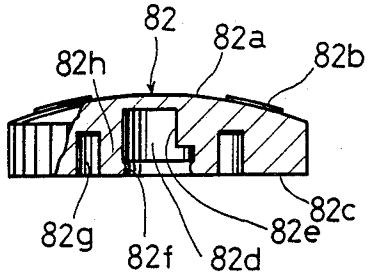
FIG. 4 is a sectional view of the adjusting knob.

An operating member or adjusting knob 82 is secured to the other end of the adjusting shaft 70 and extends outwardly of the tool housing 12. Specifically, as shown in FIG. 4, the adjusting knob 82 has on the upper surface 82*a* thereof a plurality of radially extending graduations 82*b* formed to indicate various torque settings. A desired maximum transmission torque may be obtained by setting one of the graduations 82*b* to a reference position of the tool housing 12. The adjusting knob 82 also has a hole 82*d* formed in the lower surface 82*c* thereof and a cutout face 82*e* formed on the hole 82*d*. A rounded projection 82*f* is formed adjacent the entrance of the hole 82*d* and joins to the lower surface 82*c*. An annular groove 82*g* is provided encircling the hole 82*d* through a thin wall portion 82*h*. With this arrangement, when the adjusting knob 82 is pushed on the adjusting shaft 70 with the cutout face 82*e* of the knob 82 aligned with the cutout face 70*a* of the shaft 70, the shoulder portion 70*b* of the shaft 70 is pushed against the projection 82*f* of the knob 82, thereby bending the thin wall portion 82*h* toward the groove 82*g*. As the adjusting knob 82 is further pushed on the adjusting shaft 70, the projection 82*f* of the knob 82 is snugly engaged with the groove 70*c* of the shaft 70. Thus, the adjusting knob 82 is secured to the adjusting shaft 70. It is to be noted that when the nut 76 is tightened, there is a slight clearance between the nut 76 and the adjusting knob 82.

With this arrangement of the adjusting mechanism 68, when the tightening nut 76 is turned in one direction to be tightened, the adjusting plate 72 is drawn toward the nut 76 until the lower surface of the adjusting plate 72 abuts against the shoulder portion 12a so as to lock the adjusting shaft 70. Conversely, when the tightening nut 76 is rotated in the other direction, the nut 76 is moved toward the adjusting knob 82, thereby brining the adjusting shaft 70 into a free position. In this free position, the adjusting shaft 70 is set to a desired rotational position through the adjusting knob 82, and the nut 76 is tightened in the one direction so as to lock the axial movement of the spring bearing member 54. Thus, the spring pressure of the first coil spring 64 may be adjusted. This adjustment of the biasing force permits stepless variation of the maximum torque at which the clutch mechanism 22 is shifted from its operative engaging position to its sliding position. When the spring bearing member 54 is moved backward in the axial direction of the splined portion 38 to a predetermined position where it comes in abutment against the front end of the second coil spring 66, biasing force of the second coil spring 66 is additionally imposed on the second clutch disc 46.

Thus, in the relatively low range of the maximum torque setting, the first coil spring 64 is compressed substantially in proportion to the rotational angle of the adjusting knob 82, so that the maximum torque is variable substantially in proportion to the rotation of the adjusting knob 82. On the other hand, as the biasing force of the second coil spring 66 is added in the relatively high range of the maximum torque setting, the rate of increase in torque per unit compression length of the coil springs becomes larger, so that smaller rotation of the adjusting knob 82 can provide proper adjustment of the toque in the higher torque range. Thus, proper combination of the non-linear property of the springs and the property of smoothly contoured cam permits any desired adjustment of the torque to be achieved by rotation of the adjusting knob 82 through the effective rotational angle of about 270 °.

As shown in FIG. 1, in the boundary between the tool housing 12 and the battery housing 14, a trigger 84 is pivotally supported at the lower end thereof by a pin 85. The trigger 84 is normally urged by a compression spring (not shown) in a counterclockwise direction. The upper end of the trigger 84 is operatively associated with a starting switch 86 of the motor 16 through an actuating member 88. When the trigger 84 is in the position shown in FIG. 1, the starting switch 86 is off, and when the trigger 84 is depressed and pivoted in a clockwise direction, the starting switch 86 is brought to on position.

An actuating rod 90 is operatively associated with the actuating member 88. The actuating rod 90 is inserted into the hollow shaft portion 34 of the clutch shaft 32, with its front end held in abutment against the clutch pin 50. The actuating rod 90 is normally urged toward the clutch pin 50 by a compression spring 92. With this arrangement, as the clutch mechanism 22 is released, the clutch pin 50 is moved forward in the slot 48, and thence the actuating rod 90 is moved for award to turn off the starting switch 86 through the actuating member 88.

A change-over switch 94 is provided in the front upper portion of the tool housing 12 and is accessible from outside for changing the rotation of the electric motor 16 in either forward or reverse direction.

The spindle 24 is made of non-magnetic material such as aluminum, stainless steel and copper, and is rotatably mounted within the tool housing 12 through bearings 96 and 98. The spindle 24 extends in parallel relation to the clutch shaft 32 and has a front end 24a projecting forwardly of the tool housing 12. A sleeve 100 is axially slidably mounted on the front end 24a and is urged forwardly by a spring 102. The front end 24a is formed with an axial mounting hole 114 for mounting a driver bit 112 therein and a through hole 116 extending transverse to and communicating with the mounting hole 114. A ball 118 is received in the through hole 116 and projects slightly from the through hole 116 to engage the driver bit 112, thereby preventing withdrawal of the driver bit 112 from the mounting hole 114. A magnet 124 is secured to the front end 24a in a rear portion of the mounting hole 114. The magnet 124 is positioned such that the front end of the magnet 124 abuts against the rear end of the driver bit 112.

Figure 5:
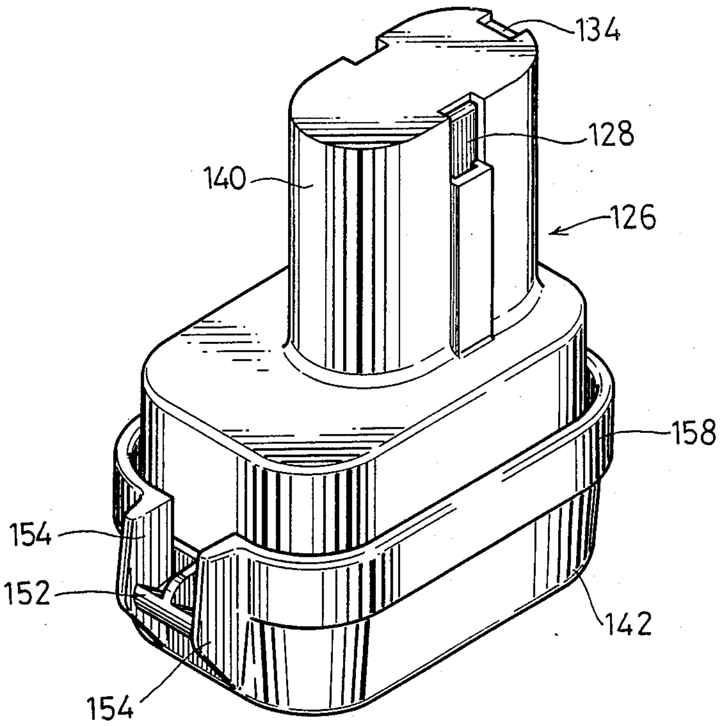
FIG. 5 is a perspective view of the battery pack shown in FIG. 1.

A battery pack 126 is removably mounted within the battery housing 14 through an opening 14b formed in the lower end 14a thereof. The battery pack 126 is made of synthetic plastic material and encases a plurality of batteries (two on the upper side and six on the lower side), such as nickel-cadmium batteries, for supplying power to the electric motor 16. FIG. 5 shows the overall construction of the battery pack 126 in perspective view.

Figure 6:
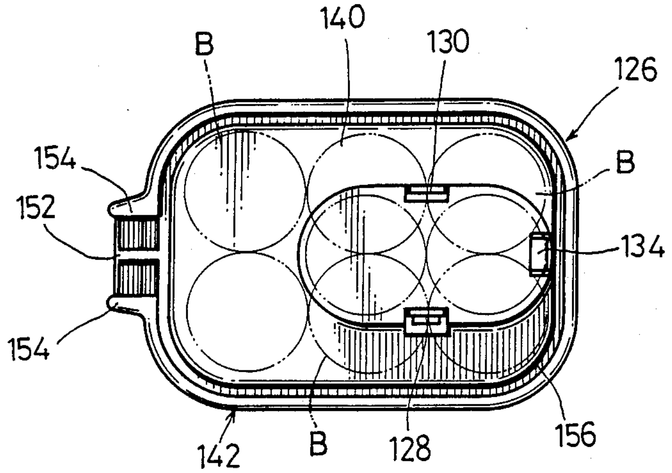
FIG. 6 is a plan view thereof.

As shown in FIGS. 1, 5 and 6, the battery pack 126 has a positive and a negative power terminal plates 128 and 130 (only a terminal plate 128 is shown in FIGS. 1 and 6) mounted on the upper opposite side thereof. The battery pack 126 also has a thermo terminal plate 134 mounted on the upper rear end thereof and connected to a thermostat 132 located in the battery pack 126 for preventing overcharge. The battery housing 14 has a support frame 136 mounted centrally therewithin. The support frame 136 has a pair of connectors 138 (only one of which is shown in FIG. 1) which are electrically connected to the respective terminals of the starting switch 86. The connectors 138 are positioned such that they contact the terminal plates 128 and 130, respectively, when the battery pack 126 is mounted in the battery housing 14.

The battery pack 126 is composed of two members, an upper case 140 having an open bottom and a lower case 142 having a closed top. The lower end of the upper case 140 is retained on a stepped portion 144 formed on the inner surface of the lower case 142. The upper case 140 also has projections 146 formed on the outer surface of the lower end thereof and adapted to engage the recesses 148 formed on the inner surface of the lower case 142. A stopper 150 made of a rectangular spring plate is pivotally mounted on the lower end of the battery housing 14 through a pin 149 and is adapted to retain a protrusion 152 formed on the front end of the lower case 142. The stopper 150 has a curved portion 150a which is resiliently fitted over the protrusion 152. When the lower end of the stopper 150 is pulled from its operative position shown in FIG. 1, the curved portion 150a is expanded and disengaged from the protrusion 152, enabling the battery pack 126 to be removed from the battery housing 14. Conversely, when the battery pack 126 is mounted in the battery housing 14, the curved portion 150a is fitted over the projection 152 by pushing the curved portion 150a on the projection 152.

Figure 7:
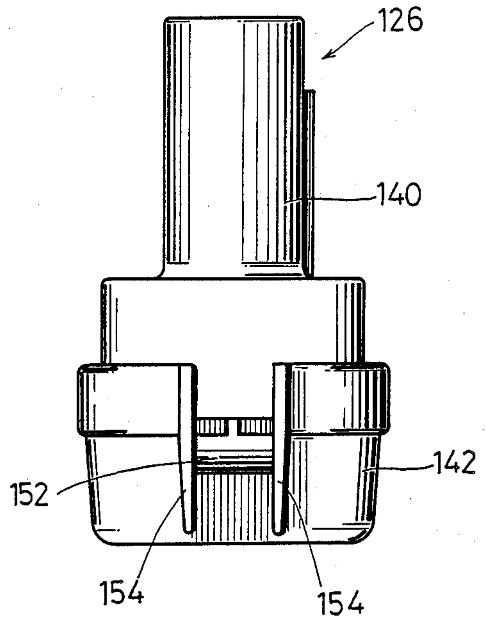
FIG. 7 is a front view thereof.

As shown in FIGS. 5 and 7, a pair of vertical extension members 154 are provided adjacent the opposite sides of the protrusion 152 and are adapted to prevent the stopper 150 from moving sideways.

Figure 8:
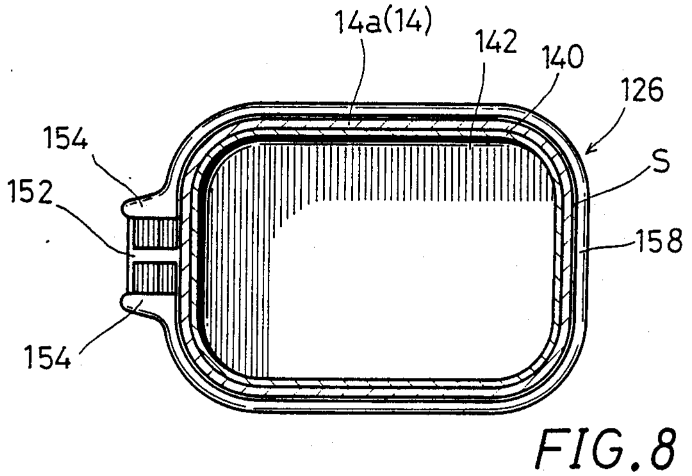
FIG. 8 is a sectional view taken along the lines VIII—VIII of FIG. 1.

The lower case 142 has on the inner periphery of the upper end thereof a stepped portion 156 which is adapted to retain the lower end 14a of the battery housing 14 thereon when the battery pack 126 is mounted in the battery housing 14. The upper end of the lower case 142 has a thin-wall flange portion 158 joined to and extending slightly outwardly from the stepped portion 156. As best shown in FIG. 8, the flange portion 158 is formed on the substantially entire periphery of the lower case 142, and cooperates with the opposite surface of the upper case 140 to provide a groove to receive the lower end 14a of the battery housing 14. The extending dimensions of the flange portion 158 is determined such that there is a slight clearance S between the flange portion 158 and the lower end of the battery housing 14. It is to be noted that such a clearance S may include a very small clearance in which the flange portion 158 does not closely contact the lower end 14a of the battery housing 14.

In the screwdriver thus constructed, the tool housing 12 encases heavyweight parts such as the motor 16 and the clutch mechanism 22, and the battery housing 14 encases relatively lightweight parts, such as batteries B, as compared with the motor 16 and other parts. For this reason, when the tool is dropped on a floor for example, the tool housing 12 first strikes on the floor, and then one side of the battery housing 14 strikes on the floor, and if the striking speed is great, the battery housing 14 is rolled about a longitudinal axis of the tool housing 12, causing the other side of the battery housing 14 to strike on the floor, and further the one side to strike on the floor again. However, if this rolling movement is produced, since the flange portion 158 is made of thin plastic material and is elastic, and since the clearance S is provided between the flange portion 158 and the battery housing 14, the flange portion 158 bends within the range of the clearance S as it strikes on the floor. Thus, the shocks may effectively absorbed by the flange portion 158, thereby mitigating the shocks to be imparted to the batteries B, the power terminal plates 128 and 130 and the thermo terminal plate 134 in the battery pack 126, or the connectors 138 in the battery housing 14 and therefore preventing possible faults of these components or improper electrical connection. In addition, since the flange portion 158 is positioned to cover the joint portion of the battery pack 126 to the battery housing 14, it serves as a protective cover. Further, when a user removes the battery pack 126 from the battery housing 14, the clearance S provided between the flange portion 158 and the battery housing 14 enables the user to better apply his finger to the flange portion 158. Thus, the battery pack 126 may be easily removed from the battery housing 14.

Figure 9:
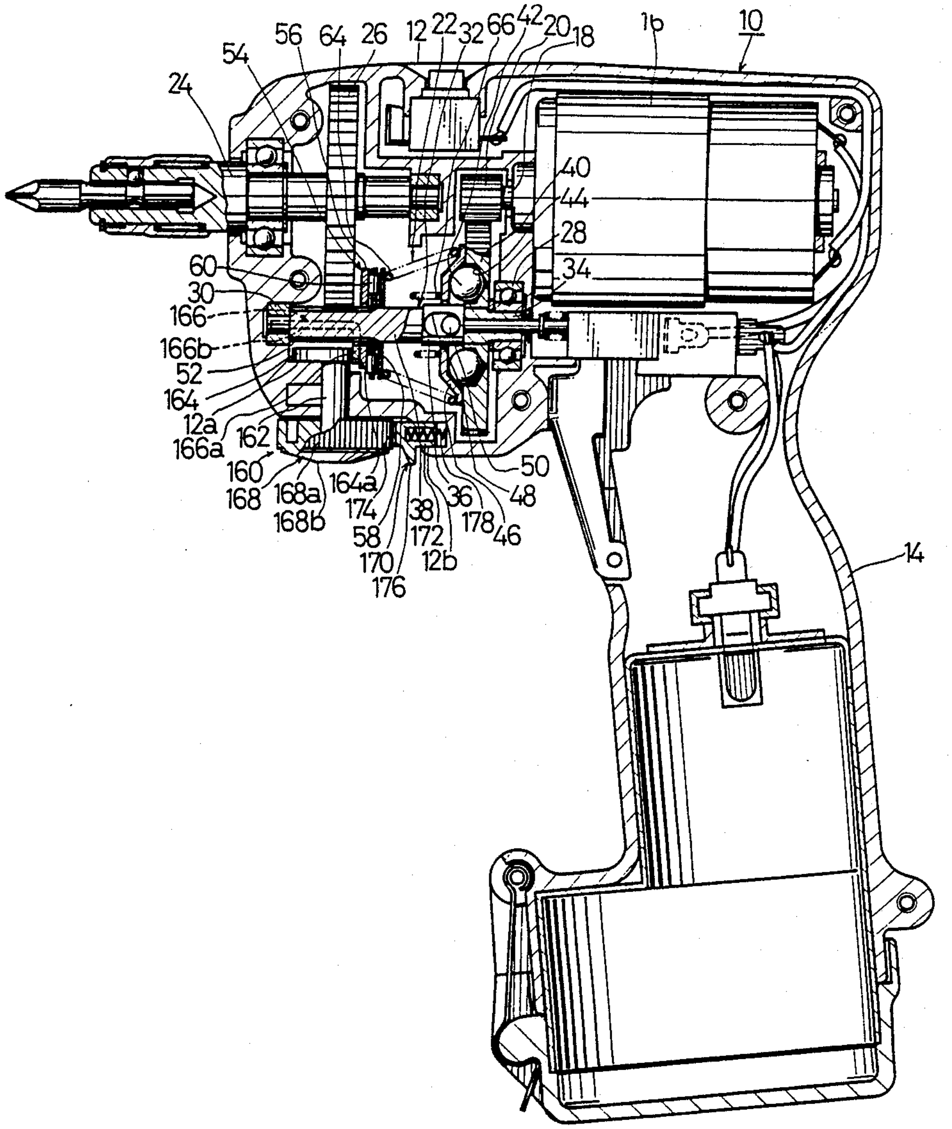
FIG. 9 is a sectional view of a power tool incorporating another embodiment of the present invention.
Figure 10:
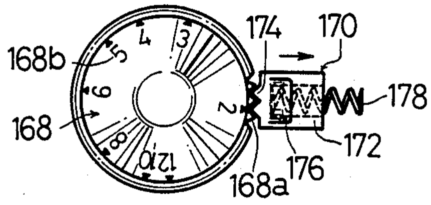
FIG. 10 is a schematic bottom view illustrating the adjusting knob and the locking means.

Another embodiment of the present is illustrated in FIGS. 9 and 10. In this embodiment, a modified adjusting mechanism 160 is provided corresponding to the adjusting mechanism 68 of the first embodiment but having a different locking mechanism for locking the rotational position of the adjusting shaft 162. Parts that are the same as those in FIG. 1 are given like reference numbers and their description will not be repeated.

The adjusting mechanism 160 includes an adjusting shaft 162 rotatably supported in the front lower portion of the tool tool housing 12. The adjusting shaft 162 is integrally secured at the one end thereof to an adjusting plate 164 which constitutes a control member for adjusting the biasing force of the first coil spring 64. The adjusting plate 164 has a cam face 164a formed on the outer periphery thereof and disposed in opposing relation to the front surface of the slider 56 of the spring bearing member 54 and has a lower surface which abuts on the shoulder portion 12a of the tool housing 12. The specific configuration of the came face 164a is the same as the cam face 72a of the first embodiment and will not again be described.

As with the first embodiment, an abutting member 166 of a generally L-shape is provided and extends axially of the splined portion 38 of the clutch shaft 32. Specifically, the abutting member 166 has a shorter leg 166a inserted between the cam face 164a and the front surface of the slider 56 and has forked longer legs 166b (only one of which is shown in FIG. 9) extending axially of the splined portion 38 for sliding movement therealong. With this arrangement, the front surface of the slider 56 is normally urged through the abutting member 166 toward the cam face 164a by the first coil spring 64, and, as the adjusting shaft 162 is rotated, the cam face 164a correspondingly changes its engaging portion with the abutting member 166, so that the slider 56 is shifted axially of the splined portion 38.

As shown in FIG. 9, an adjusting knob 168 constituting an operating member which can be manually operated is fitted on the other end of the adjusting shaft 162 opposite to the adjusting plate 164 and extends outwardly of the tool housing 12. As shown in FIG. 10, the adjusting knob 168 has on the entire outer periphery thereof a plurality of fine serrations 168a and has on the lower surface thereof a plurality of radially extending graduations 168b indicating various torque settings, so that the torque setting graduations 168b may be properly set to a reference position as will be mentioned later to obtain a desired maximum transmission torque.

The tool housing 12 has a mounting hole 12b formed in the front lower portion thereof opposite to the outer periphery of the adjusting knob 168. In the mounting hole 12b, locking means 170 is received for positioning the adjusting knob 168, and serves also as a reference position for the torque setting graduations 168b. The locking means 170 includes a body 172 in the form of a block, at least two pawls 174, a finger lever 176, and a spring 178. The body 172 is slidably received in the mounting hole 12b and has an open end. The pawls 174 are formed on the other end of the body 172 in opposed relation to the serrations 168a on the outer periphery of the adjusting knob 168 so as to be brought in and out of engagement therewith. The finger lever 176 is integrally formed with the body 172 and projected from the lower surface of the body 172. The spring 178 has one end inserted in the body 172 through the open end thereof and the other end in abutment against the bottom of the mounting hole 12b so as to be compressed therebetween. The spring 178 serves to normally urge the pawls 174 in engagement with the serrations 168a on the outer periphery of the adjusting knob 168.

With this arrangement of the adjusting mechanism 160, when the locking means 170 is in its operative position, as shown in FIG 9, the two pawls 174 are held in engagement with the serrations 168a on the outer periphery of the adjusting knob 168, so that the adjusting knob 168 and the adjusting shaft 162 are fixed in position. On the contrary, when the body 174 of the locking means 170 is moved to the right as viewed in FIG. 9 against the biasing force of the spring 178 through the finger lever 176, the engagement between the two pawls 174 and the serrations 168a is released, so that the adjusting knob 168 and the adjusting shaft 162 are brought into their free position The adjusting shaft 162 now in the free position is turned and set to a desired rotational position through the adjusting knob 168. After this setting, the finger lever 176 is released to cause the locking means 170 to lock the adjusting shaft 162. The spring bearing member 54 is then locked against axial movement along the splined portion 38. Thus, the spring pressure of the first coil spring 64 may be adjusted. This adjustment of the biasing force permits stepless variation of the maximum torque at which the clutch mechanism 22 is shifted from its operative engaging position to its sliding position. When the spring bearing member 54 is moved backward in the axial direction of the splined portion 38 to a predetermined position where it comes in abutment against the front end of the second coil spring 66, biasing force of the second coil spring 66 is additionally imposed on the second clutch disc 46. The action of the first and second coil springs 64 and 66 in response to the varying maximum torque setting is the same as in FIG. 1 and its description will not be repeated.

After a desired torque is set, the locking means 170 is released from the rightwardly biased position shown in FIG. 9, so that the body 174 is moved to the left by the biasing force of the spring 178 and the two pawls 174 are brought in engagement with the opposing serrations 168a on the outer periphery of the adjusting knob 168. This assures the adjusting knob 168 and the adjusting shaft 162 to be fixed in position and held in that condition.

While the invention has been described with reference to preferred embodiments thereof, it is to be understood that modifications or variations may be easily made without departing from the scope of the present invention which is defined by the appended claims.

What is claimed is:

1. A power driven rotary tool comprising:

a tool housing;

an electric motor mounted within said tool housing and having an output shaft;

a first clutch member operatively connected to the output shaft of said electric motor;

a spindle rotatably mounted in said tool housing and having a tool bit removably secured to the front end thereof;

a torque adjusting mechanism for adjusting driving torque to be transmitted to said spindle of the tool to a fixed value;

said torque adjusting mechanism including a second clutch member operatively connected to said spindle and shiftable between a first position in which said second clutch member is in driving engagement with said first clutch member and a second position in which said second clutch member is in slipping engagement with said first clutch member;

biasing means for normally biasing said second clutch member into driving engagement with said clutch member;

control means disposed in said tool housing for smoothly adjusting the biasing force of said biasing means to a discrete biasing value within a continuous range of design biasing force values;

manually-adjustable operating means including an adjusting knob operable from outside of the tool for operating said control means and for setting a desired maximum transmission torque as determined by setting and reference positioning indicia on said knob and tool housing; and positioning means for holding said control means in an operative position adjusting the biasing force of said biasing means at said discrete value.

2. The power driven rotary tool as defined in claim 1 wherein said control means comprises a plate cam having a cam face formed on the outer periphery thereof, the distance from the center of said cam face being gradually increased over an angle range of at least 270°.

3. The power driven rotary tool as defined in claim 1 wherein said manually-adjustable operating means comprises said adjusting knob having a plurality of serrations formed on the outer surface thereof, and wherein said positioning means includes locking means mounted on said tool housing and directly engageable with said serrations of said adjusting knob so as to directly lock said adjusting knob in an operative position.

4. The power driven rotary tool as defined in claim 1 wherein said positioning means comprises a threaded shaft carried on said tool housing and operatively connecting said control means to said operating means, and a positioning nut engageable with said threaded shaft and press-abuttable against the outer surface of said tool housing, whereby when said positioning nut is tightened onto said threaded shaft, the biasing force adjusting position of said control means may be held at said discrete value.

* * * * *